United States Patent [19]

Olsen

[11] 4,111,221
[45] Sep. 5, 1978

[54] LOW RESTRICTION, NORMALLY OPEN VALVE CONSTRUCTION HAVING A DEFORMABLE BLADDER

[76] Inventor: Charles R. Olsen, 307 Connestoga Way, Suite 37, Eagleville, Pa. 19408

[21] Appl. No.: 653,274

[22] Filed: Jan. 28, 1976

[51] Int. Cl.² .................. F16K 7/02; F16K 7/10; F16L 55/12

[52] U.S. Cl. .................. 137/67; 89/1 B; 137/625.48; 251/61; 251/61.1; 251/191; 251/DIG. 2

[58] Field of Search .............. 137/67, 68 A; 251/11, 251/61, 61.1, 61.2, 63, 63.5, 190, 191, 324, 326, 327, 335 R, 335 A, 335 B, DIG. 2; 60/632; 92/98 D; 220/261; 89/1 B

[56] References Cited

U.S. PATENT DOCUMENTS

| | | | |
|---|---|---|---|
| 2,557,448 | 6/1951 | Mathisen | 251/11 X |
| 2,781,051 | 2/1957 | Hawley | 251/61.1 X |
| 3,013,571 | 12/1961 | Fulton | 137/68 A |
| 3,106,131 | 10/1963 | Barr et al. | 60/632 X |
| 3,422,832 | 1/1969 | Moulton | 137/67 |
| 3,478,760 | 11/1969 | Hosek | 137/68 A |
| 3,890,994 | 6/1975 | Olsen | 251/61.1 X |

FOREIGN PATENT DOCUMENTS 160,913   1/1953   Australia ................. 251/327

*Primary Examiner*—Martin P. Schwadron
*Assistant Examiner*—Richard Gerard
*Attorney, Agent, or Firm*—McCormick, Paulding & Huber

[57] ABSTRACT

A normally open valve construction utilizes a valve housing defining a fluid passageway extending through the housing between at least two ports, and an expandible, metallic bladder within the housing. The bladder is mounted in non-obstructing relationship with the fluid passageway when the valve is open and is expanded across the passageway in flow-obstructing relationship when the valve is closed. The bladder in the expanded condition has a generally tubular configuration and is closed at one end. In the non-expanded condition, one portion of the tubular configuration is folded coaxially within an adjacent portion to shorten its axial length and to remove all portions of the bladder from the fluid passageway. A pyrotechnic squib or other fluid pressure generator discharges within the tubular configuration to extend the bladder into the fluid passageway and close the valve.

13 Claims, 10 Drawing Figures

LOW RESTRICTION, NORMALLY OPEN VALVE CONSTRUCTION HAVING A DEFORMABLE BLADDER

BACKGROUND OF THE INVENTION

The present invention relates to a valve construction for a "single-shot" valve intended for use in a one time operation. More particularly, the invention relates to a valve which utilizes a deformable metallic bladder and which constitutes an improvement over a previously patented valve construction described and claimed in my U.S. Pat. No. 3,890,994, issued June 24, 1975.

As discussed in my above-identified patent, "single-shot" valves and similar devices operated by pyrotechnic charges and deformable metallic bladders are quite suitable for "one-time" operations in missile systems and the like because they may be stored for long periods of time in an inactive state without severely affecting their reliability and they may be operated from remote locations by means of an electrical firing squib. Furthermore, the fluids which actuate the valves can be confined within the valve and isolated from the primary fluids controlled by the valve. Thus, contamination of the controlled fluids is avoided. While the high pressures generated by the firing squib require certain safety precautions, it has been found that the deformable metallic bladders can be safely designed to contain such pressures during actuation and that the residual pressures assist in holding the bladder in an expanded condition sealing the valve in the closed condition.

Valves utilizing a metallic bladder of the type described are generally characterized by high reliability because they eliminate sliding or rotating seals in the form of O-rings or packing glands which generally permit a limited quantity of leakage and which are always subject to deterioration caused by abrasive wear or hardening. Thus, valve using a deformable, metallic bladder for one-time operation possesses many attractive features militating in favor of its use.

In the normally open valve construction shown in my above referenced patent, the deformable, metallic bladder has a generally tubular shape and has one end in a crushed condition projecting into the fluid passageway through the valve. When the valve is actuated, the crushed portion expands and fills the passageway to obstruct fluid flow through the valve. While such a valve is suitable in many installations, the crushed portion of the bladder does provide some restriction within the fluid passageway prior to actuation of the valve, and also prevents a conventional valve plug from sharing the same seat or portion of the fluid passageway through the valve.

It is, accordingly, a general object of the present invention to provide a valve construction utilizing a deformable, metallic bladder which does not intrude into the fluid passageway through the valve in the normally open valve condition.

SUMMARY OF THE INVENTION

The present invention resides in a normally open valve for a fluid system. The valve utilizes a deformable, metallic bladder to close the valve in a one-time operation.

The valve has a housing defining first and second fluid ports and a fluid passageway extending through the housing between the ports. The deformable bladder is formed by an expandable body having a generally tubular shape which is closed at one end and which extends across the passageway between the ports in flow-obstructing relationship when in the expanded condition. The body is mounted to the housing at the end opposite the closed end, and is preferably held in a bore of the housing for alignment and reinforcement. In the non-expanded condition, the body has one tube portion folded coaxially within an adjacent portion and thusly is shortened in axial length to remove the closed end from flow-obstructing relationship with the passageway and allow unimpeded flow through the valve. In the preferred embodiments, the closed end of the expandible body is carried in close-fitting relationship with the bore of the housing.

Means are connected with the interior of the tubular bladder to force the folded tube portion outwardly of the adjacent portion and extend the body into the fluid passageway of the housing. The means for forcing may include a pyrotechnic squib, which produces a quantity of pressurized gas, or other fluid pressure systems, and a piston may be installed within the bladder to transmit pressure forces directly to the closed end while isolating the end and the passageway from the actuating fluid within the bladder. The close-fitting relationship of the bladder and the bore and the internal pressure cause the folded tubular walls of the bladder to unroll in the manner of a rolling diaphragm, and the axial length of the bladder is thus extended.

The valve construction with a tubular bladder having the folded tubular walls may be designed to cooperate with the fluid passageway without impeding fluid flow during the normally open condition of the valve. It may also cooperate with alternate valve closing means and share a common seat within the passageway. Additionally, the valve shares the reliability safety, and other operational features of the valve shown and described in my above-identified patent.

DESCRIPTION OF THE PREFERRED EMBODIMENTS

Figure 1:
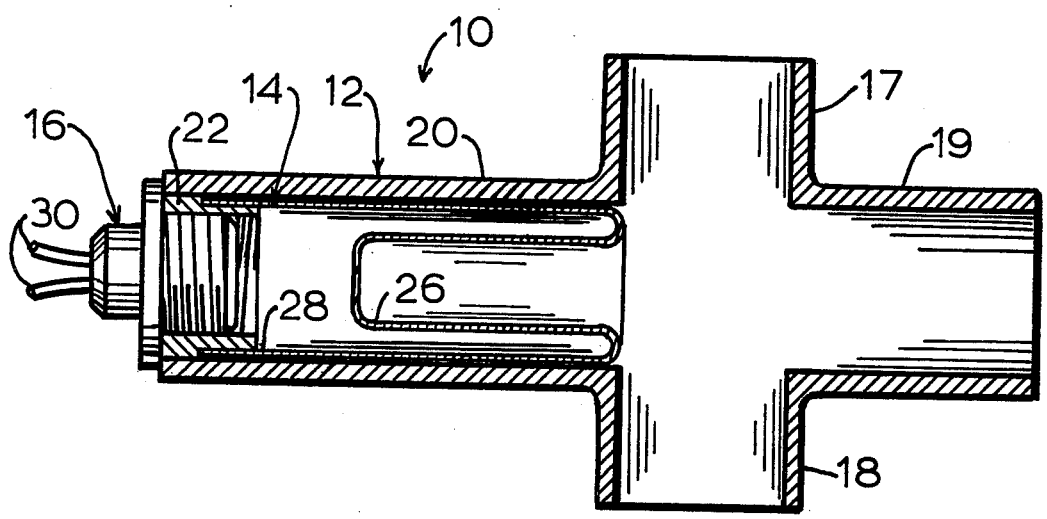
FIG. 1 is a cross sectional view of my valve in the normally open condition with the deformable metallic bladder in the non-expanded condition.
Figure 2:
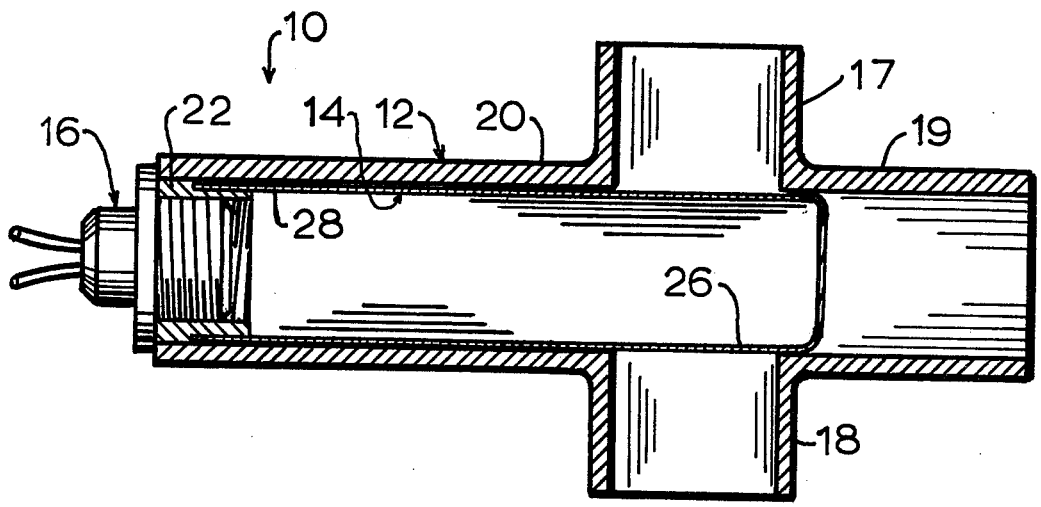
FIG. 2 is a cross sectional view of the valve in FIG. 1 with the bladder in the expanded condition closing the passageways of the valve.

FIGS. 1 and 2 illustrate one embodiment of my normally open valve construction. The valve, generally designated 10, is comprised principally of a housing 12, a deformable, metallic bladder 14 within the housing and means such as an electrically actuated, pyrotechnic squib 16 for forcing the bladder into an expanded condition on command.

The housing 12 has three intersecting cylindrical ducts 17, 18 and 19 which define fluid passageways through the valve between ports associated with each of the ducts on the exterior of the housing. In use, the ducts are connected with a fluid system in which fluid flow is to be controlled by the valve. It will be understood that fluid may flow through the passageways in various directions. For example, fluid may enter the duct 19 and exit through the ducts 17 and 18. Also, one of the ducts, for example, the duct 18, may be omitted and fluid may flow through the two remaining ducts 17 and 19 in one direction or the other.

The housing 12 also has a cylindrical extension 20 projecting away from the intersection of the ducts 17, 18 and 19. The deformable metallic bladder 14 is mounted within the extension 20 by means of a cylindrical collar 22. The bladder 14 is welded or otherwise attached to the collar and the collar is in turn welded or otherwise sealed to the outer end of the cylindrical extension 20.

In the expanded condition of the bladder 14 illustrated in FIG. 2, the bladder has a generally tubular shape and is closed at the one end 26 which projects into the passageways defined by the ducts 17, 18 and 19. In this expanded condition, the bladder prevents flow through one or more of the ducts. In the non-expanded condition of FIG. 1, the bladder resembles the extendible, actuating member in U.S. Pat. No. 3,106,131 issued to Barr et al. The closed end 26 is plastically deformed and inverted within a limited adjacent portion of the tubular shape. In the non-expanded condition of the bladder, the passageways through the ducts are unobscured and fluid flow through the passageways is unimpeded.

To form the bladder with the hat-shaped end 26 illustrated in FIG. 1, a sheet of ductile steel may be first formed as a cup having a large flange in a spinning, deep drawing or hydro forming process. Then the flange is reverse drawn in a tubular configuration over the cup so that the bladder is finally formed with the closed end inverted within the tubular shape as shown in FIG. 1.

With the one end 26 of the deformable bladder 14 inverted, the opposite end 28 is fastened to the collar 22 and the collar is in turn fastened to the extension 20 of the valve housing 12. The collar 20 is internally threaded and the pyrotechnic squib 16 is threaded into the collar for attachment to the valve housing 12. Thus, the end 28 of the bladder 14 which would therwise be opened is sealed by the collar and the squib.

When it is desired to actuate the valve 10, the electrical leads 30 of the squib 16 are connected to a low voltage source and a pyrotechnic charge within the squib is exploded to generate a selected volume of high pressure gases within the interior of the deformable bladder 14. The high pressure gases develop forces on the inverted end 26 of the bladder and drive the inverted end outwardly into the passageways of the ducts 17, 18 and 19 as illustrated in FIG. 2. Preferably, the outside diameter of the tubular bladder 14 and the inside diameter of the bore in the cylindrical extension 20 are approximately the same so that the bore reinforces the bladder and prevents radial expansion under the internal pressures developed by the squib 16. The diameter of the bore 20 and the diameter of the duct 19 may be equal and may be larger or smaller than the diameters of the passageways through the ducts 17 and 18 depending upon the flow desired after valve closing. Fluid flow through the ducts 17 and 18 as well as the duct 19 is completely precluded and the bladder will be forced against a finite seat within the intersection of the ducts 17 and 18 if the diameters of ducts 17 and 18 are slightly smaller than the diameter of the duct 19. If the diameters of the ducts 17 and 18 are sufficiently larger than the duct 19, flow between the passageway of the ducts 17 and 18 is permitted.

The size of the pyrotechnic charge within the squib 16 should be selected to generate a quantity of high pressure gas sufficient to expand the bladder axially from the shortened to the extended condition and also provide a residual pressure to hold the bladder against the ducts 17, 18 and 19 in sealing relationship.

Of course, means other than the pyrotechnic squib 16 may be provided to develop the forces which expand the deformable bladder 14. For example, the squib 16 may be removed from the collar 22 and a suitably controlled source of pressurized gas or other fluid at a remote location may be connected by high pressure conduits to the collar 22. Thus, the source of energy which expands the bladder as well as the triggering mechanism may be located remotely of the valve 10.

Figure 3:
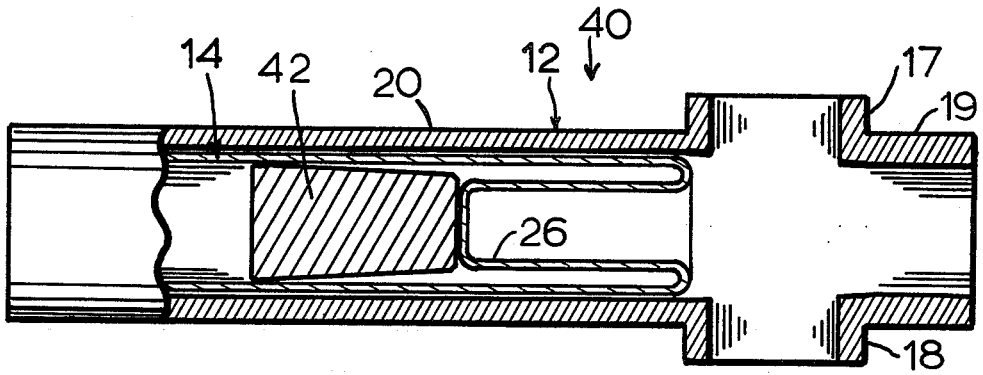
FIG. 3 is a cross sectional view showing an alternate embodiment of my valve with the bladder in the non-expanded condition.
Figure 4:
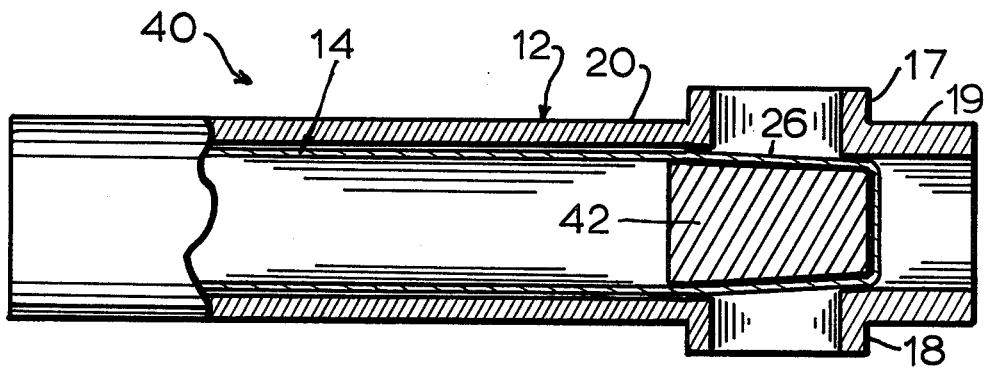
FIG. 4 is a cross sectional view of the valve in FIG. 3 with the bladder in the expanded condition closing the passageways of the valve.

An alternate embodiment of my normally open valve, generally designated 40, is illustrated in FIGS. 3 and 4. In this embodiment, parts already described and shown in connection with FIG. 1 bear the same reference numerals. The pyrotechnic squib 16 and the collar 22 attaching the squib and bladder 14 to the extension 20 are not illustrated for simplicity.

In the valve 40, the tubular bladder 14 has the closed end 26 inverted within the bladder in the non-expanded condition in the same manner as described above. However, a tapered piston 42 is mounted within the bladder adjacent to and preferably in contact with the end wall of the inverted end 26. The skirt or left portion of the piston as viewed in FIGS. 3 and 4 is substantially the same size as the inside diameter of the tubular bladder and may be provided with an O-ring to seal the piston against the inside wall of the bladder. The piston tapers inwardly from the skirt portion and the degree of taper is made to match that defined between the inner end of the extension 20 and the inner end of the duct 19.

When hot gases from the pyrotechnic squib or pressurized fluid are introduced into the deformable bladder 14 at the left of the tapered piston 42 in FIG. 3, forces developed by the pressurized gases or fluid operate against the piston and the piston pushes against the inverted end 26. The tubular walls unroll and the piston finally reaches its seated position within the extended end 26 as illustrated in FIG. 4. When seated, the piston and bladder seal the passageway within the duct 19 and, again, by appropriate selection of the diameters of the passageways within the ducts 17 and 18, fluid flow within these ducts may be permitted or terminated also. Residual pressure within the bladder 14 and friction developed by the piston and bladder wedged within the housing 12 hold the piston 42 in the seated position. Any fluid pressure developed within the passageways of conduits 17, 18 and 19 operates against the bladder but the piston within reinforces the tubular walls and the end wall to prevent the bladder from deforming and allowing leakage between the passageways. The piston also isolates the hot gases of the pyrotechnic squib from the end 26 of the bladder and fluids within the passageways.

Figure 5:
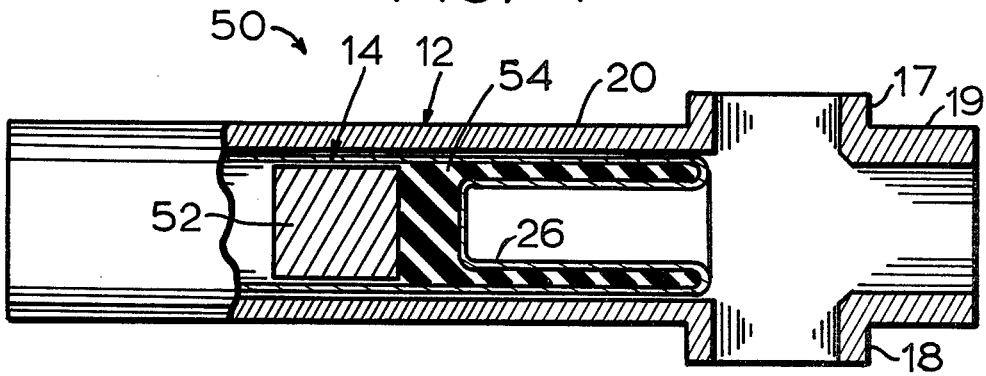
FIG. 5 is a cross sectional view illustrating still another embodiment of my valve with the deformable metallic bladder in the non-expanded condition.
Figure 6:
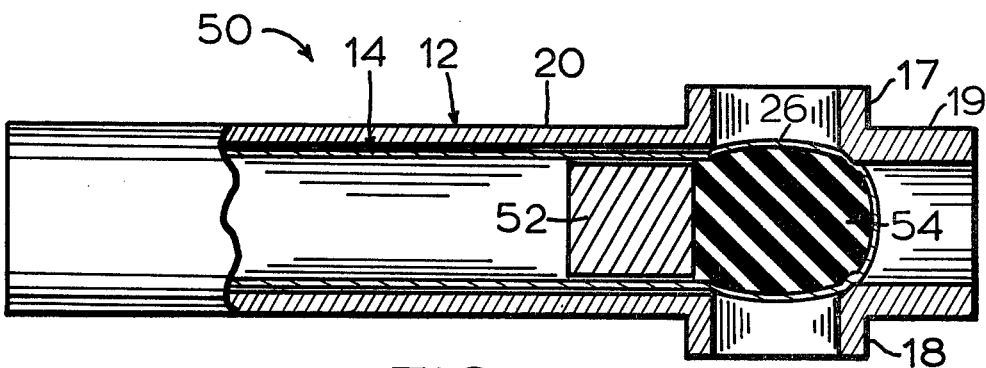
FIG. 6 is a cross sectional view of the valve in FIG. 5 and shows the deformable, metallic bladder in the expanded condition closing the fluid passageways of the valve.

FIGS. 5 and 6 illustrate still another embodiment of the normally open valve, generally designated 50, and in this embodiment also parts previously described and illustrated in the embodiments of FIGS. 1-4 bear the same reference numerals.

The valve 50 is similar in construction to the valve shown in FIGS. 3-4 except that a non-tapered piston 52 is mounted within the deformable metallic bladder 14 and a viscous material 54 is interposed between the piston and the closed end 26 of the bladder. The viscous material may be a maleable wax or putty that readily conforms to the space in which it is confined and yet is incompressible when placed under pressure by the piston 52.

In operation of the valve 50, the pressure is developed within the bladder 14 at the left end of the piston 52 as viewed in FIGS. 5 and 6. The pressure may be developed by means of a pyrotechnic squib or other fluid pressurizing systems connected to the valve housing 12 at the outer end of the extension 20. The piston 52 slides in close fitting relationship within the bladder 14 and may be provided with an O-ring or other seal to prevent the pressurized gases from leaking passed the piston toward the viscous material 54. Thus, pressure developed against the left hand side of the piston is transmitted by the piston to the viscous material which in turn forces the end 26 of the bladder out of its inverted condition and expands the bladder into the condition illustrated in FIG. 6. In the expanded condition, the bladder is situated in the passageways defined by the ducts 17, 18 and 19 and in engagement with the inner end of duct 19. Again, by appropriate selection of the inside diameters of the ducts 17 and 18, communication between these ducts may either be interrupted or maintained.

It will be noted that the viscous material 54 operates hydrostatically upon the closed end 26 of the bladder and forces the tubular walls and the end wall outwardly at all unsupported points. This operation of the material 54 is desirable since it insures that the bladder is properly seated in sealing relationship with the housing 12 at all desired points within the fluid passageways. The material 54 and the piston 52 also provide isolation between the pressurized fluid operating against the piston 52 and the fluid within the system controlled by the valve 50. Also, the material 54 reinforces the bladder 14 against pressures that develop in the fluids controlled by the valve. Residual pressure operating on the piston 52 and any friction developed between the piston and the bladder maintain the viscous material 54 under pressure to provide such reinforcement.

Figure 7:
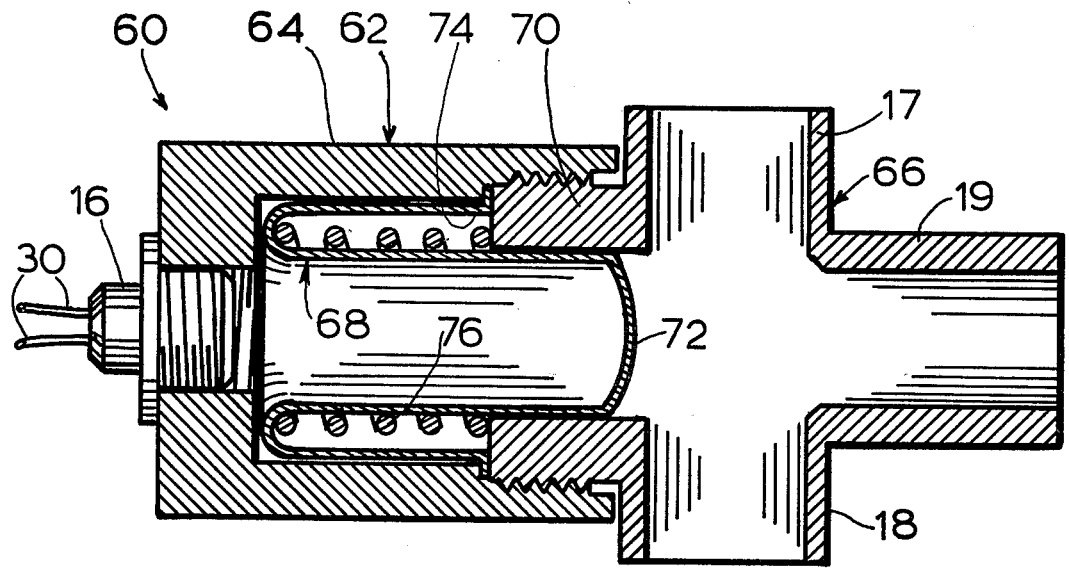
FIG. 7 is a cross-sectional view showing still another embodiment of my valve with the bladder in the non-expanded condition.
Figure 8:
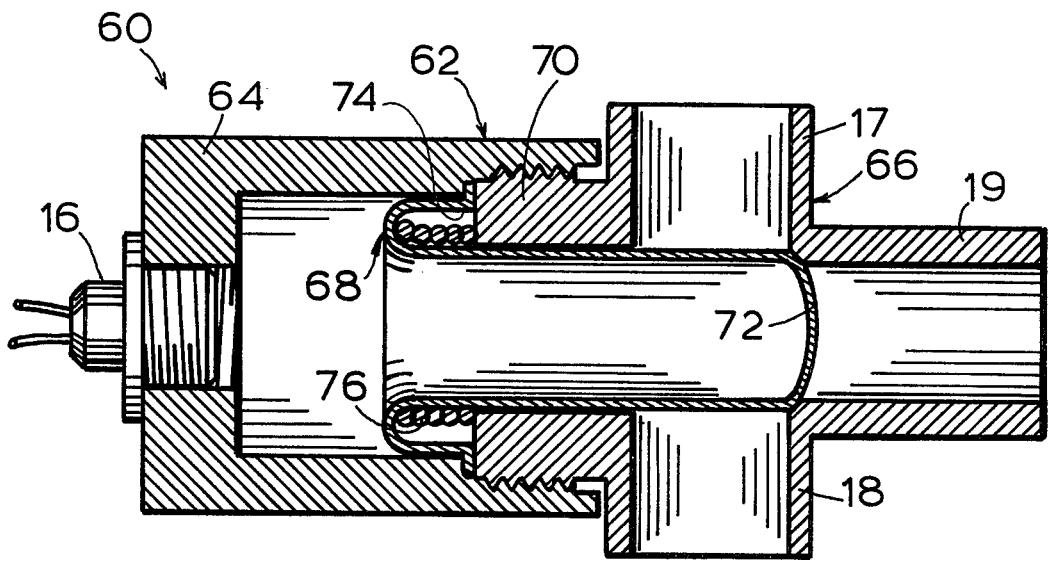
FIG. 8 is a cross-sectional view of the valve in FIG. 7 with the bladder in the expanded condition closing the passageways of the valve.

FIGS. 7 and 8 illustrate another embodiment of my normally open valve, generally designated 60. Parts previously described and illustrated in FIGS. 1-6 bear the same reference numerals.

In the valve 60, the housing 62 is comprised of one portion 64 in which the squib 16 is threadably mounted and another portion 66 defining the intersecting ducts 17, 18 and 19. The bladder 68, like the bladders in the foregoing embodiments, is comprised of an inverted metallic tube in which one tube portion is folded or drawn coaxially within an adjacent portion in axially overlapping relationship to form an inversion in the tube walls. In the present embodiment, the closed end 72 of the bladder extends coaxially through the remaining portion of the bladder and projects through the open end 74 of the bladder into the bore of an extension 70 projecting from the housing portion 66. The bore of the extension 70 is only slightly larger than the outside diameter of the closed end 72 and establishes a close-fitting guide for the bladder. The open end 74 of the bladder is captured in sealing relationship between the extension 70 and a shoulder at the inward end of the bore within the housing portion 64.

During extension of the bladder 68 from the normally open position of the valve illustrated in FIG. 7 to the closed position of the valve illustrated in FIG. 8, the tubular walls roll inwardly rather than outwardly as in the foregoing embodiments. The closed end 72 moves axially out of the bore and across the fluid passageway to close duct 18 and also ducts 17 and 18 depending upon their diameter.

Optionally, a reinforcing coil spring 76 is mounted circumaxially about the intermediate portion of the bladder between the open and closed ends. The spring 76 provides additional hoop strength for the tubular walls within, and prevents collapse of the tubular walls without, when the squib 16 is detonated. Thus, the spring 76 maintains a finite curvature at the fold in the tubular walls as the bladder is extended axially by the pressurized gases. It will be noted that the coils of the spring 76 are expanded about the intermediate portion of the bladder in FIG. 7 while the same coils in FIG. 8 are compressed due to the bladder extension. The spring may be formed from circular or rectangular section wire or a series of spaced rings may be used instead.

Figure 9:
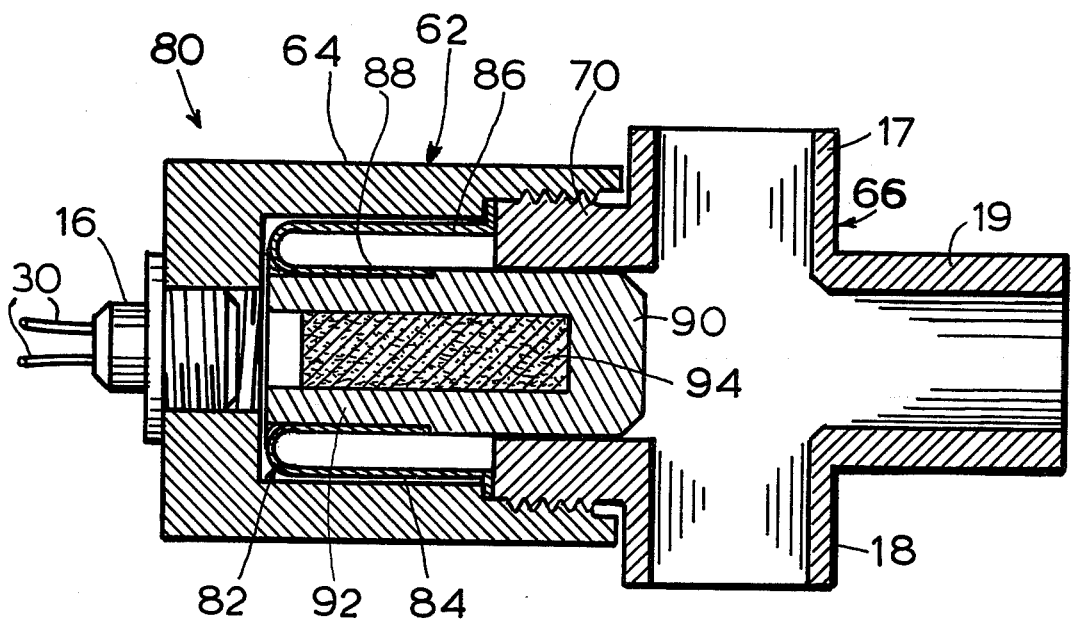
FIG. 9 is a cross-sectional view of still another embodiment of the valve with the bladder in the non-expanded condition.
Figure 10:
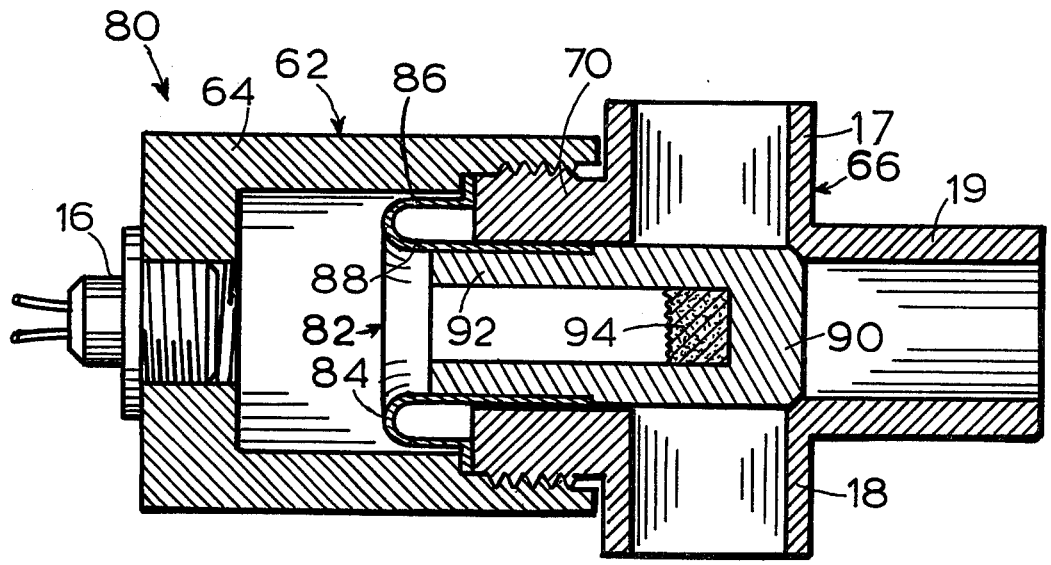
FIG. 10 is a cross-sectional view of the valve in FIG. 9 with the bladder in the expanded condition.

FIGS. 9 and 10 illustrate still another embodiment of the normally open valve, generally designated 80, in which corresponding parts previously described bear the same reference numerals. The valve 80 closely resembles the valve 60 of FIGS. 7 and 8 in that the valve housings are identical and the bladder 82 is mounted in the same manner as the bladder 68.

The bladder 82 has an inverted tubular portion 84 which is open at the end 86 and closed at the inner end 88 by means of an elongated plug 90. The plug 90 has a reduced tail section 92 which fits within the end 88 of the tubular portion 84 and is brazed or otherwise sealingly connected to the portion 84 to insure that gases emanating from the squib 16 do not escape through the bladder into the ducts 17, 18 or 19.

In operation, the plug 90 is initially in the position illustrated in FIG. 9 with the tip of the plug retracted into the extension 70 and out of the fluid passageways of the fluid ducts 17, 18 and 19. After the squib 16 has been ignited, the plug 90 is propelled axially into the fluid passageways to the position illustrated in FIG. 10 closing the duct 19 and also the ducts 17 or 18 depending upon their diameter. As the plug moves between the FIG. 9 and FIG. 10 positions, the cylindrical walls of the tubular portion 84 roll inwardly away from the housing portion 64 and confine the pressurized gases within the housing.

For lighter weight, the plug 90 forming part of the bladder 82 may have a central bore opening at the tail section 92 adjacent the squib 16. Optionally, an end burning propellant 94 may be placed in the central bore to provide a slower closing of the valve when the propellant is ignited by a small charge in the squib. The rate at which gas is generated by the propellant is limited by the sustainer grain in the propellant and the endburning effect in the bore. Preferably, a small quantity of the propellant remains in the bore when the plug reaches the valve closing position as shown in FIG. 10 so that an additional quantity of pressurized gas is generated to hold the bladder in the expanded condition closing the valve.

While the present invention has been described in several preferred embodiments, it will be understood that still further modifications and substitutions can be had without departing from the spirit of the invention. For example, the valve housing need not always be provided with three intersecting ducts. A valve seat against which the bladder expands can be located in various locations within the fluid passageways. The bladder may be integrated within a more conventional valve having a gate or mechanically actuated screw plug for opening and closing the valve. The gate may operate in conventional fashion to open and close the valve and the bladder may be reserved for closing the valve in emergency situations. The inverted bladder is particularly advantageous in such composite valves because it is normally situated out of the fluid passageway through the valve and does not interfere with the more conventional valve gates. When called upon in an emergency situation, the bladder extends rapidly across the passageway in flow-obstructing relationship. Accordingly, the present invention has been described in several preferred embodiments by way of illustration rather tham limitation.

I claim:

1. A normally open valve for a fluid system comprising:
    a valve housing defining first and second fluid ports and a fluid passageway extending through the housing between the ports;
    an expandible body including a pressure confining metallic tube closed at a first axial end and open and mounted to the housing at the opposite, second axial end, the body in the non-expanded condition having one tube portion folded co-axially within an adjacent tube portion to form an inversion in the tube wall between the axial tube ends, the first and second axial ends being movable axially of the tube relative to one another with an accompanying rolling of the fold between said tube portions to expand the body, the body in the expanded condition of the tube being extended across the fluid passageway of the housing in flow-obstructing relationship and in the non-expanded condition being removed from flow-obstructing relationship with the passageway, the inversion in the tube wall being located in the wall at a station farther from the fluid passageway than the second axial end mounted to the housing whereby the fold forming the inversion rolls toward and moves closer to the second axial end as the body expands and extends across the fluid passageway; and
    means connected with the housing for pressurizing the tube between the tube ends to move the first and second ends axially of the tube relative to one another while confining the pressure within the tube walls to axially extend the tube into the expanded body condition obstructing flow in the fluid passageway of the housing.

2. A normally open valve as defined in claim 1 wherein the metallic tube in the non-expanded condition of the body has one axial one folded coaxially within a limited adjacent portion of the tube.

3. A normally open valve as defined in claim 1 wherein the metallic tube in the non-expanded condition of the body has the closed tube end folded coaxially within the remaining tube portion and projecting through the opposite, second axial end of the tube.

4. A normally open valve as defined in claim 1 wherein the expandible body includes a plug closing the first axial end of the metallic tube.

5. A normally open valve as defined in claim 1 wherein:
    the valve housing includes a cylindrical bore intersecting the fluid passageway; and
    the closed end of the metallic tube moves in close-fitting relationship within the bore of the housing.

6. A normally open valve for one time operation in a fluid system comprising:
    a valve housing defining first and second fluid ports and a fluid passageway extending through the housing between the ports;
    an expandible metallic body having a generally tubular pressure restraining shape closed at one end and mounted to the housing at the opposite end, the body extending across the fluid passageway between the ports in flow-obstructing relationship in an axially expanded condition of the tubular shape and in the non-expanded condition having one portion withdrawn coaxially within the adjacent portion to form an inversion in the tubular shape between the opposite ends and remove the closed end from flow-obstructing relationship with the passageway, the tubular, metallic body being mounted in the housing in a position extending axially from said opposite end away from the fluid passageway to the inversion, and reversibly from the inversion back toward the fluid passageway and the closed end; and
    pressurizing means connected with the interior of the tubular body for forcing the withdrawn portions axially outwardly of the adjacent tubular portion while the tubular shape restrains the interior pressure and thereby forces the closed end across the passageway obstructing flow.

7. A normally open valve as defined in claim 6 wherein the means for pressurizing comprises a gas generator mounted in sealing relationship with said opposite end of the metallic body.

8. A normally open valve as defined in claim 7 wherein the gas generator includes a pyrotechnic squib.

9. A normally open valve as defined in claim 6 wherein:
    the housing defines a bore intersecting the passageway between the ports;
    the inversion in the metallic body provides overlapping tubular portions between the mounted end and the inversion and a remaining, non-overlapped portion, and the non-overlapped portion at the closed end is positioned within the bore and is substantially the same size as the bore; and
    the means for forcing comprises means for developing pressure against the interior of the metallic body at said closed end whereby said non-overlapped portion at the closed end is prevented from expanding radially by the bore and the withdrawn portion of the tubular body is forced through the bore into the expanded condition of the body.

10. A normally open valve as defined in claim 9 wherein the means for developing pressure against the interior of the metallic body includes a fluid pressure generator connected with the interior of the closed end.

11. A valve construction for one-time operation comprising:

a valve housing defining a fluid passageway leading through the housing between two ports on the exterior of the housing and also defining a bore intersecting the fluid passageway; and a deformable metallic bladder having a generally tubular shape in both a non-expanded and an axially expanded, pressure generated condition and positioned in the housing adjacent the fluid passageway, the tubular shape of the bladder being closed at one end and having the end received within the bore of the housing in close-fitting relationship adjacent the passageway, the bladder being axially inverted within itself in the non-expanded condition to shorten the axial length of the tubular shape and remove the one end of the bladder from the passageway, the inversion in the inverted tubular shape being disposed at one end of the bladder opposite from the end received in the bore intersecting the fluid passageway and in the pressure expanded condition the tubular walls of the inverted bladder being unrolled to lengthen the bladder in the axial direction and extend the one end into the fluid passageway in a flow obstructing position.

12. A valve construction as defined in claim 11 wherein:

the housing further defines a valve seat in the fluid passageway directly opposite the intersection of the bore and the passageway; and the deformable metallic bladder has a tubular shape in the expanded condition placing the bladder in sealing relationship with the valve seat.

13. A valve construction as defined in claim 11 wherein the deformable metallic bladder is comprised of a metallic tube and a plug closing one end of the tube, the tube wall being inverted coaxially upon itself between the tube ends to shorten the axial length of the bladder in the non-expanded condition.

* * * * *

UNITED STATES PATENT OFFICE
CERTIFICATE OF CORRECTION

Patent No. 4,111,221     Dated September 5, 1978

Inventor(s) Charles R. Olsen

It is certified that error appears in the above-identified patent and that said Letters Patent are hereby corrected as shown below:

Column 3, line 60, "therwise" should be --otherwise--.

Column 6, line 23, "18" (first occurrence) should be --19--.

Column 8, line 5, "one" (second occurrence) should be --end--.

Signed and Sealed this

Twelfth Day of June 1979

[SEAL]

Attest:

RUTH C. MASON
Attesting Officer

DONALD W. BANNER
Commissioner of Patents and Trademarks